US011888260B2

(12) United States Patent
Kataoka

(10) Patent No.: US 11,888,260 B2

(45) Date of Patent: Jan. 30, 2024

(54) CONNECTOR HAVING CONNECTION ASSISTING SLIDER MOUNTED IN HOUSING

(71) Applicant: SUMITOMO WIRING SYSTEMS, LTD., Mie (JP)

(72) Inventor: Daisuke Kataoka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 89 days.

(21) Appl. No.: 17/666,186

(22) Filed: Feb. 7, 2022

(65) Prior Publication Data

US 2022/0255262 A1 Aug. 11, 2022

(30) Foreign Application Priority Data

Feb. 10, 2021 (JP) ................................ 2021-019451

(51) Int. Cl.

*H01R 13/629* (2006.01)

*H01R 13/506* (2006.01)

(52) U.S. Cl.

CPC ..... *H01R 13/62938* (2013.01); *H01R 13/506* (2013.01)

(58) Field of Classification Search

None

See application file for complete search history.

(56) References Cited

U.S. PATENT DOCUMENTS 5,316,347 A * 5/1994 Arosio .................... F16L 37/56 285/85

5,474,462 A * 12/1995 Yamanashi ...... H01R 13/62933 439/153

6,244,880 B1 6/2001 Fukase et al.

6,264,485 B1 * 7/2001 Saka ................ H01R 13/62938 439/372

6,666,697 B2 * 12/2003 Yamashita ....... H01R 13/62977 439/157

6,755,674 B2 * 6/2004 Fujii ................ H01R 13/62938 439/372

7,670,157 B2 * 3/2010 Miyamoto ....... H01R 13/62938 439/157

(Continued)

FOREIGN PATENT DOCUMENTS

EP 3229326 A1 10/2017

EP 3232518 A1 10/2017

(Continued)

*Primary Examiner* — Oscar C Jimenez

(74) *Attorney, Agent, or Firm* — Venjuris, P.C.

(57) ABSTRACT

A connector includes a first housing and a second housing to be connected to each other, and a connection assisting member to be mounted into the first housing. The connection assisting member includes a cam groove extending from an entrance to a back end. The cam groove has a connection cam surface to be pushed by a cam pin in a connecting direction of the first housing and a recess connected to an end part of the connection cam surface on the side of the back end and recessed more in the connecting direction than the end part of the connection cam surface on the side of the back end. The cam pin located on the side of the back end of the cam groove is arranged not to contact an inner surface of the recess with the first and second housings connected to each other.

6 Claims, 8 Drawing Sheets

(56) References Cited

U.S. PATENT DOCUMENTS

| | | | | |
|---|---|---|---|---|
| 2002/0182491 | A1* | 12/2002 | Maegawa ........ | H01R 13/62933 429/157 |
| 2014/0242819 | A1 | 8/2014 | Suzuki | |
| 2014/0242820 | A1 | 8/2014 | Suzuki | |
| 2014/0242821 | A1 | 8/2014 | Suzuki | |
| 2014/0242822 | A1 | 8/2014 | Suzuki | |
| 2018/0331470 | A1 | 11/2018 | Suzuki et al. | |
| 2021/0273377 | A1 | 9/2021 | Nozaki | |

FOREIGN PATENT DOCUMENTS

| | | | |
|---|---|---|---|
| JP | 2004-311255 | A | 11/2004 |
| JP | 2006-351415 | A | 12/2006 |
| JP | 2009-117045 | A | 5/2009 |

* cited by examiner

CONNECTOR HAVING CONNECTION ASSISTING SLIDER MOUNTED IN HOUSING

CROSS-REFERENCE TO RELATED APPLICATIONS

This application is based on and claims priority from Japanese Patent Application No. 2021-019451, filed on Feb. 10, 2021, with the Japan Patent Office, the disclosure of which is incorporated herein in its entirety by reference.

TECHNICAL FIELD

The present disclosure relates to a connector.

BACKGROUND

Japanese Patent Laid-open Publication No. 2014-165030 discloses a connector configured by connecting a lever-side connector to a fixed-side connector. The fixed-side connector includes a cam follower. The lever-side connector includes a lever, and the lever includes a cam groove. When the lever is rotated, the cam follower is displaced along the cam groove and the lever-side connector is connected to the fixed-side connector. A connector of this type is also disclosed in Japanese Patent Laid-open Publication Nos. 2001-052810, 2004-311255, 2006-351415, 2009-117045, 2017-188390, 2017-191704, 2018-195400 and 2020-013666.

SUMMARY

With the lever-side connector connected to the fixed-side connector, the cam follower is kept constantly in contact with the cam groove. Thus, if vibration of an engine or the like is transmitted to the connector, a stress is applied to the cam follower (cam pin), with the result that the durability of the cam follower (cam pin) may be affected.

Accordingly, the present disclosure aims to provide a technique capable of reducing a stress applied to a cam pin.

The present disclosure is directed to a connector with a first housing and a second housing to be connected to each other, and a connection assisting member to be mounted into the first housing, wherein the second housing includes a cam pin, the connection assisting member includes a cam groove extending from an entrance to a back end, the cam groove has a connection cam surface to be pushed by the cam pin in a connecting direction of the first housing and a recess connected to an end part of the connection cam surface on the back end side and recessed more in the connecting direction than the end part of the connection cam surface on the back end side, and the cam pin located on the back end side of the cam groove is arranged not to contact an inner surface of the recess with the first and second housings connected to each other.

According to the present disclosure, a stress applied to a cam pin can be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
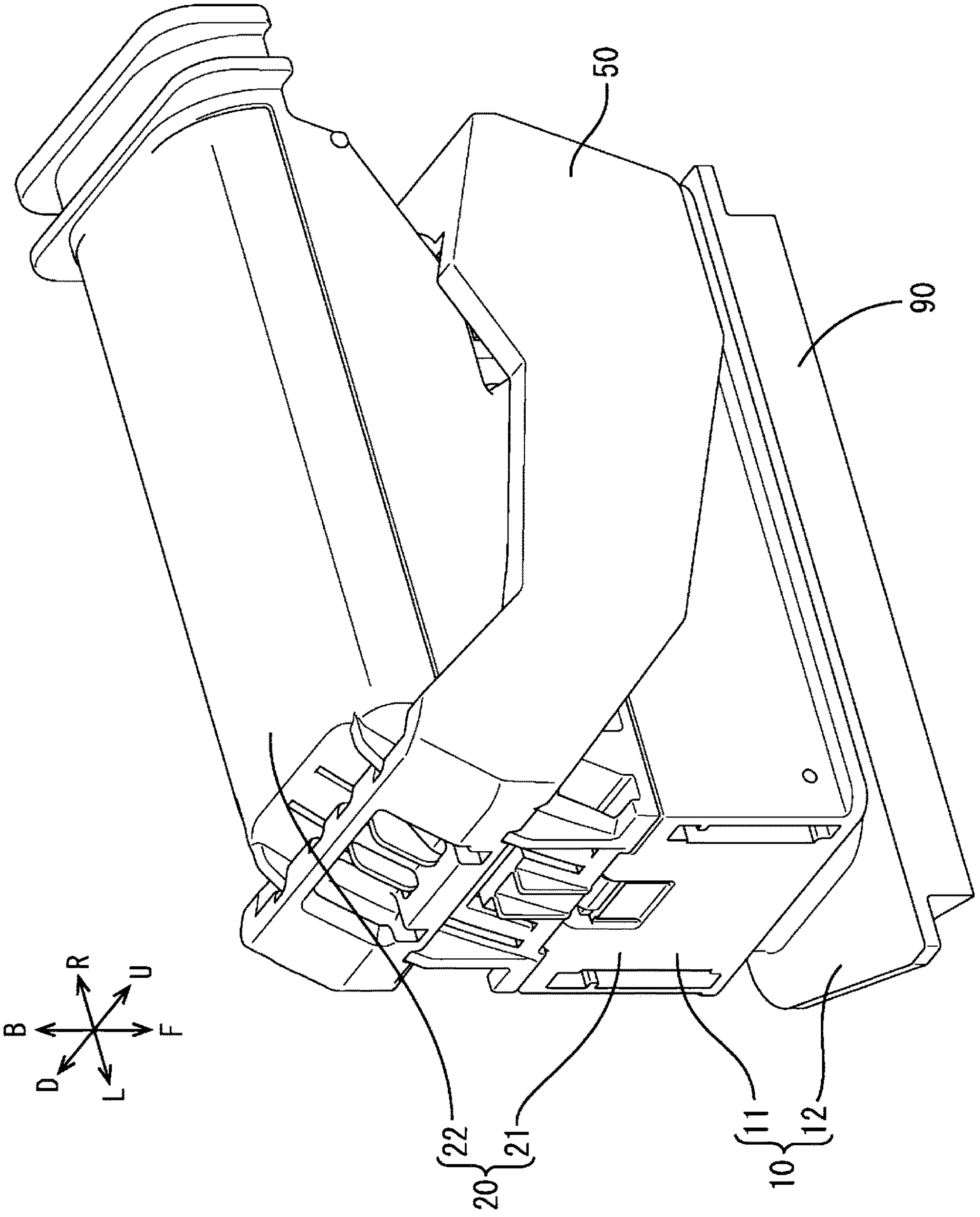
FIG. 1 is a perspective view of a connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure includes a first housing and a second housing to be connected to each other, and a connection assisting member to be mounted into the first housing, wherein the second housing includes a cam pin, the connection assisting member includes a cam groove extending from an entrance to a back end, the cam groove has a connection cam surface to be pushed by the cam pin in a connecting direction of the first housing and a recess connected to an end part of the connection cam surface on the back end side and recessed more in the connecting direction than the end part of the connection cam surface on the back end side, and the cam pin located on the back end side of the cam groove is arranged not to contact an inner surface of the recess with the first and second housings connected to each other.

This connector includes the connector assisting member. The cam groove of the connector assisting member has the connection cam surface to be pressed in the connecting direction of the first housing by the cam pin. Thus, the first housing can be connected to the second housing by the connector assisting member. Further, the cam groove of the connector assisting member includes the recess connected to the end part of the connection cam surface on the back end side and recessed more in the connecting direction than the end part of the connection cam surface on the back end side. In the connected state, the cam pin is arranged not to contact the inner surface of the recess. Thus, even if vibration is transmitted to this connector from outside, the cam pin is less likely to contact the cam groove, with the result that a stress applied to the cam pin in the connected state can be reduced.

(2) Preferably, the cam pin includes an angle portion having an angular shape on a side opposite to the connecting direction when viewed from an axial direction of the cam pin.

Since the cam pin includes the angle portion, strength is higher as compared to a configuration not including the angle portion. Further, since the angle portion is provided on the side of the cam pin opposite to the connecting direction, it can be avoided that the angle portion contacts the inner surface of the recess and a stress is applied to the cam pin.

(3) Preferably, the cam pin is arranged not to contact the connection cam surface in the connected state.

Since the cam pin is arranged not to contact not only the inner surface of the recess, but also the connection cam surface in the connected state of this connector, a stress received from the cam groove by the cam pin can be further reduced.

(4) Preferably, the recess has an inclined surface connected to the end part of the connection cam surface on the back end side without any step.

In this connector, the cam pin can be made less likely to contact the inner surface of the recess.

Details of Embodiment of Present Disclosure

A specific example of the present disclosure is described below with reference to the drawings. Note that the present invention is not limited to these illustrations and is intended to be represented by claims and include all changes in the scope of claims and in the meaning and scope of equivalents.

Embodiment

Figure 6:
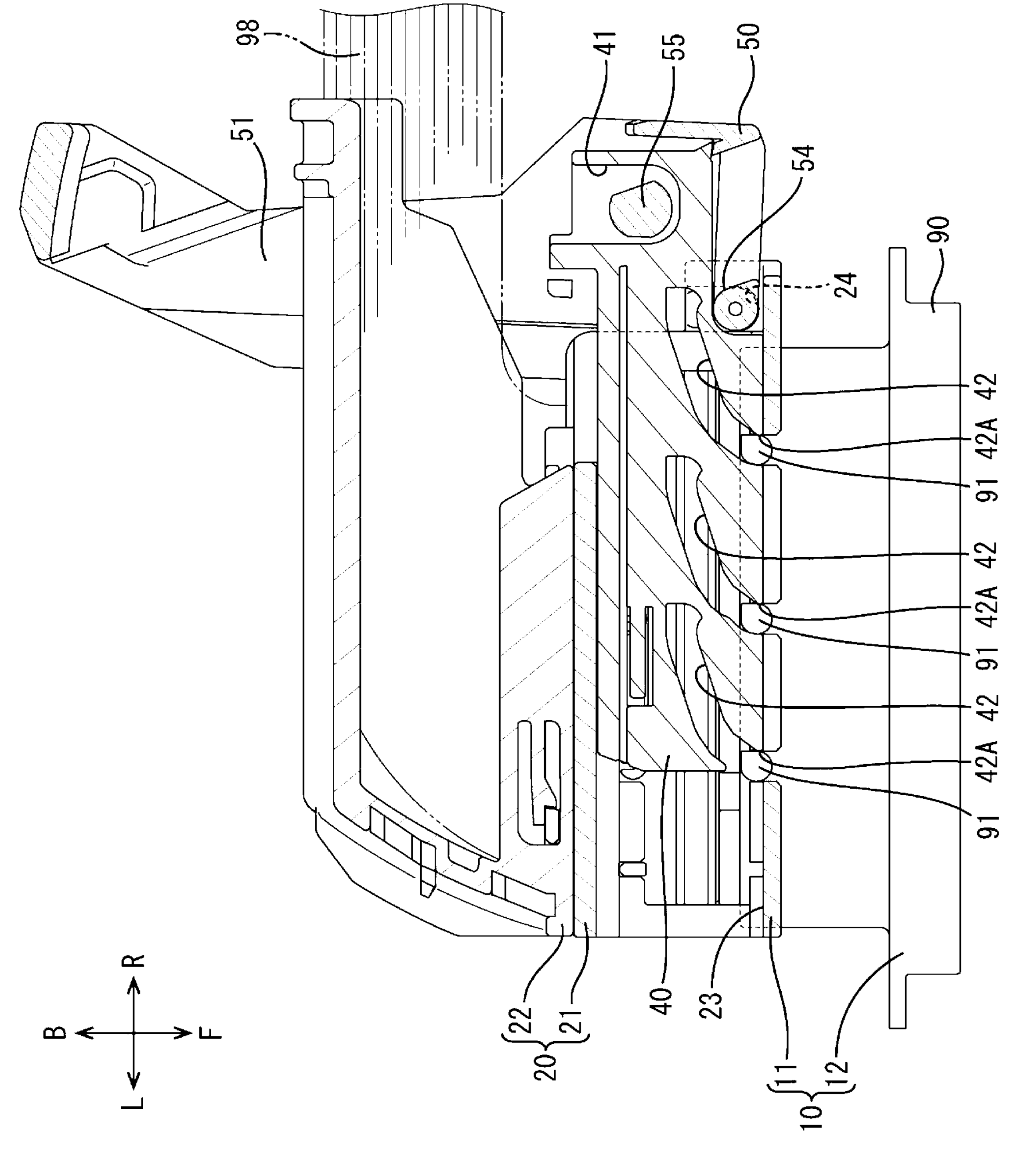
FIG. 6 is a plan view in section of the connector when connection is started.
Figure 7:
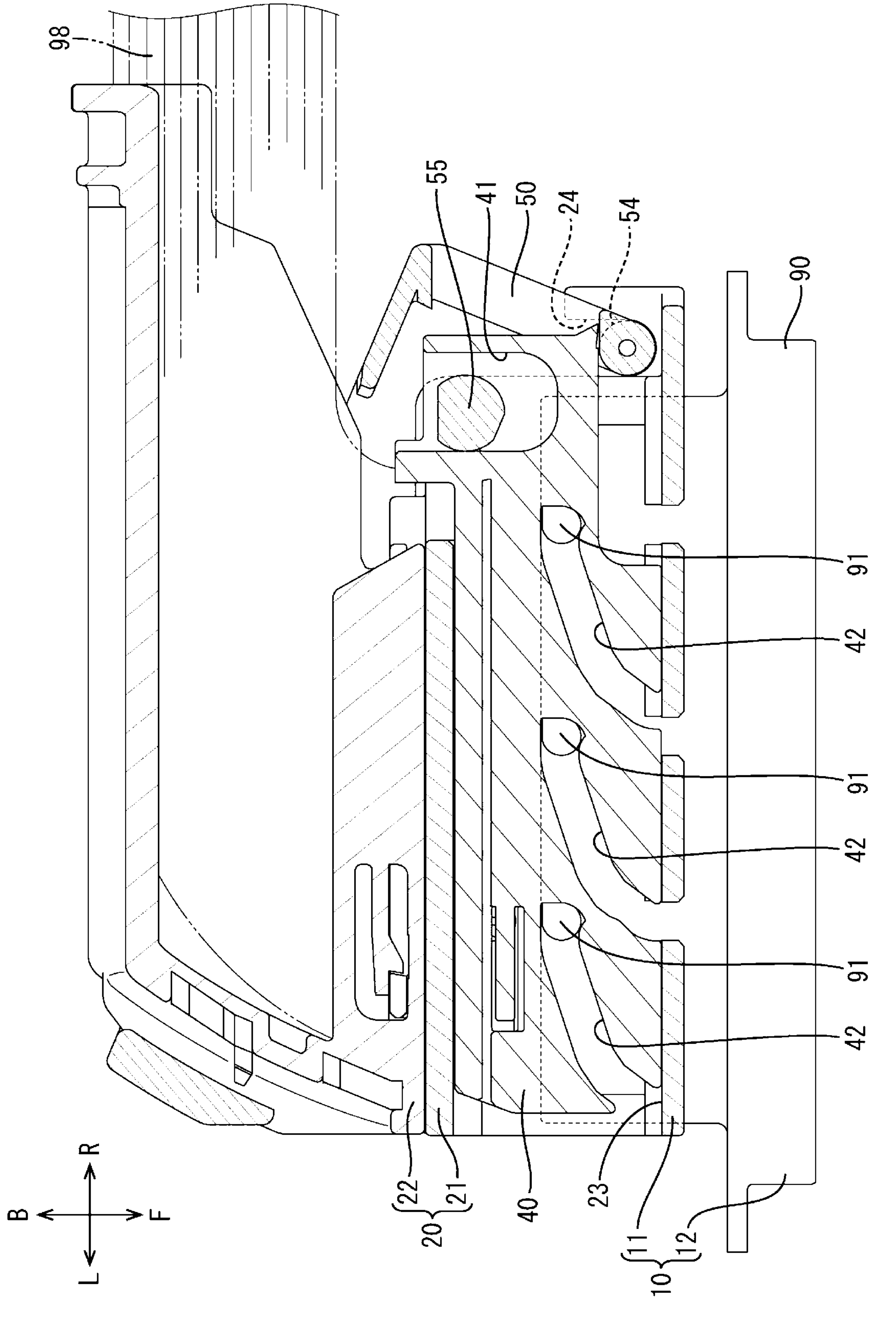
FIG. 7 is a plan view in section of the connector in a connected state.
Figure 8:
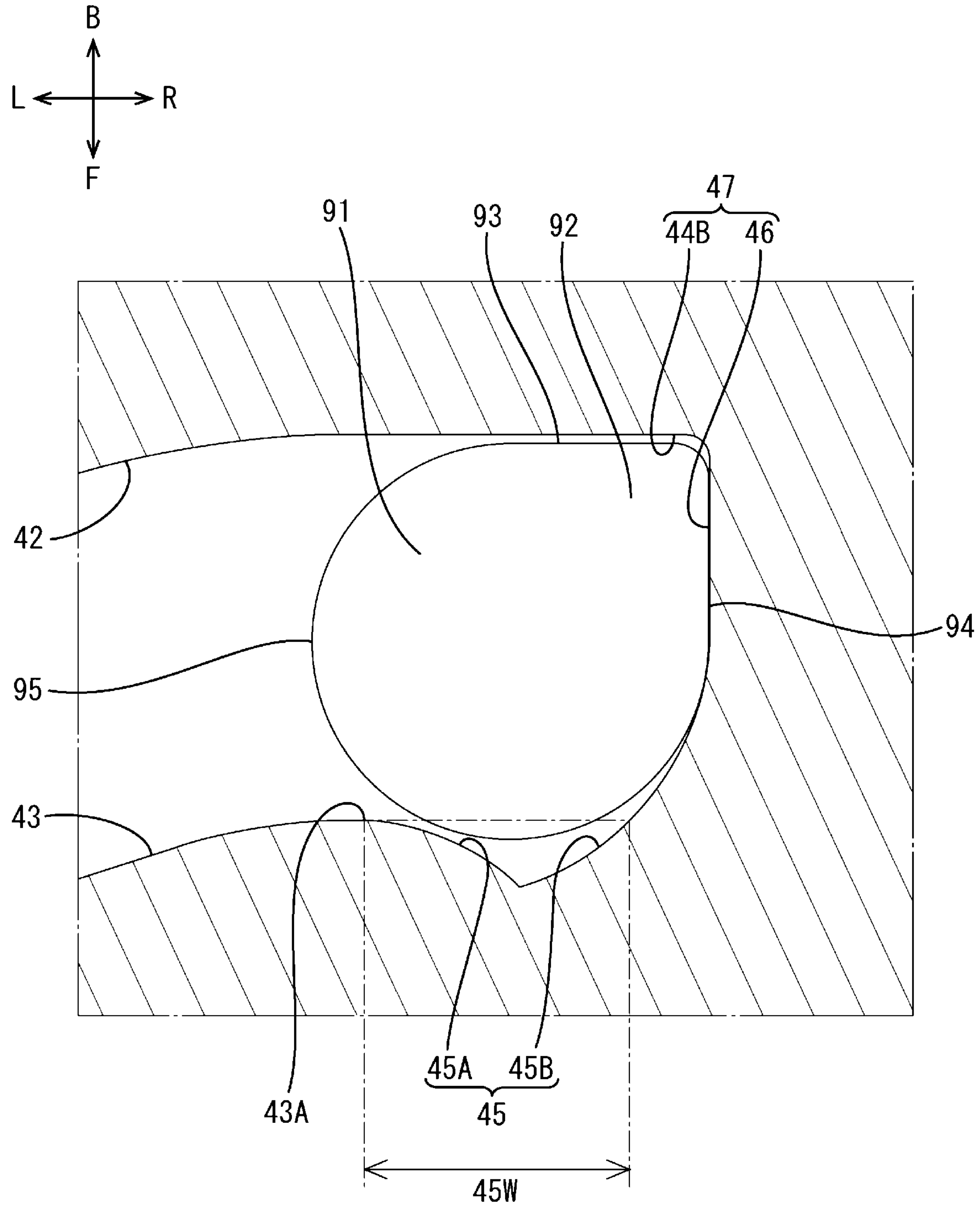
FIG. 8 is an enlarged view around a cam pin shown in FIG. 7.

A connector 10 is illustrated in one embodiment. As shown in FIG. 1, the connector 10 includes a first connector 11 and a second connector 12 to be connected to each other. Note that, in the following description, a lower side and an upper side in FIGS. 6 to 8 are referred to as a front side and a back side concerning a front-back direction. Left and right sides shown in FIGS. 6 to 8 are directly defined as left and right sides concerning a lateral direction. A direction orthogonal to the planes of FIGS. 6 to 8 is defined as a vertical direction. Further, a forward direction corresponds to a "connecting direction" of the first connector 11, and a backward direction corresponds to a "separating direction" of the first connector 11. Note that, in figures, "F", "B", "U", "D", "L" and "R" denote the front side, the back side, the upper side, the lower side, the left side and the right side.

Figure 2:
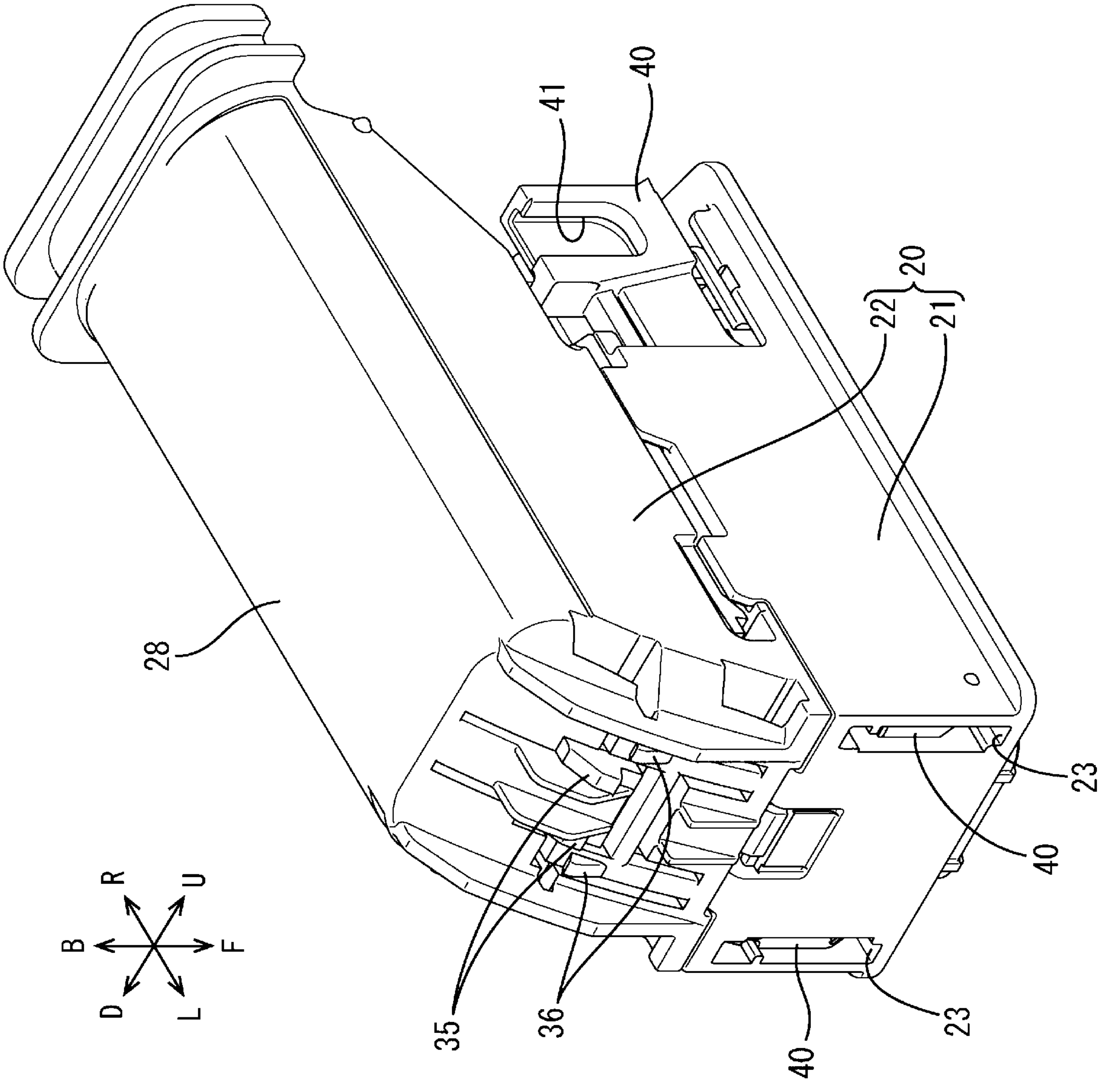
FIG. 2 is a perspective view showing a state where an operating member is removed from a first housing.

The first connector 11 is a lever-type connector. As shown in FIGS. 1 and 2, the first connector 11 includes a first housing 20, a pair of connection assisting members 40 and an operating member 50.

The first housing 20 is made of synthetic resin. As shown in FIG. 2, the first housing 20 includes a housing body 21 in the form of a block long in the lateral direction and a wire cover 22 to be mounted on a back side of the housing body 21.

A plurality of unillustrated terminal fittings are accommodated into the housing body 21. Wires 98 (see FIG. 7) attached to the terminal fittings are drawn out from an opening in the back surface of the housing body 21. As shown in FIGS. 2 and 7, the housing body 21 is formed with a pair of upper and lower guide recesses 23 extending in the lateral direction. Both left and right ends of the guide recess 23 are open in both left and right surfaces of the housing body 21. The connection assisting member 40 is accommodated into the guide recess 23. As shown in FIG. 7, the housing body 21 is formed with a pair of upper and lower rotary shaft receiving portions 24 (only one is shown in FIG. 7). The pair of rotary shaft receiving portions 24 are arranged on a right end side of the housing body 21. The rotary shaft receiving portions 24 support the operating member 50 rotatably between an initial position and a connection position.

As shown in FIG. 2, the wire cover 22 includes a cover body 28, a pair of upper and lower first locking portions 35 and a pair of upper and lower second locking portions 36. As shown in FIG. 7, the cover body 28 is mounted on the housing body 21 to cover the back surface of the housing body 21. The cover body 28 is open in front and right surfaces and holds the wires 98 drawn out backward from the opening in the back surface of the housing body 21 in a state bent rightward. The pair of upper and lower first locking portions 35 and the pair of upper and lower second locking portions 36 are provided on the left surface of the cover body 28 as shown in FIG. 2. The pair of upper and lower first locking portions 35 and the pair of upper and lower second locking portions 36 lock the operating member 50 arranged at the connection position.

Figure 3:
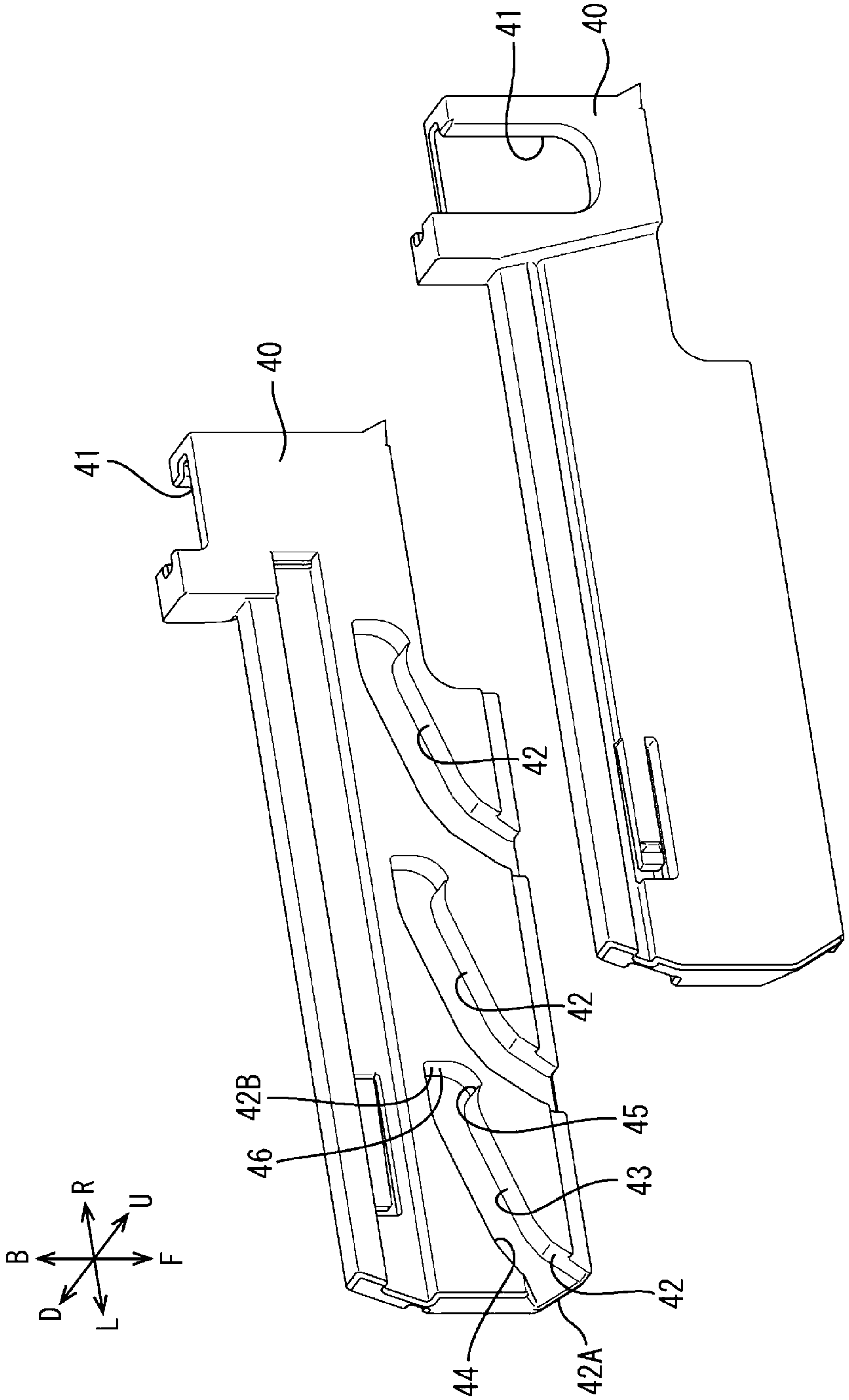
FIG. 3 is a perspective view of connection assisting members.

The pair of connection assisting members 40 are made of synthetic resin and, in this embodiment, are sliders configured to slide in the lateral direction with respect to the first housing 20. As shown in FIG. 3, each of the pair of connection assisting members 40 is a plate having a rectangular shape long in the lateral direction in a plan view. As shown in FIG. 7, the pair of connection assisting members 40 are mounted in the first housing 20 while being inserted in the guide recesses 23 with a plate thickness direction aligned with the vertical direction. The connection assisting members 40 inserted in the guide recesses 23 are movable in the lateral direction with displacements in the front-back direction and vertical direction restricted by the guide recesses 23. Each of the pair of connection assisting members 40 includes a drive shaft receiving portion 41 and cam grooves 42.

As shown in FIGS. 3 and 7, the drive shaft receiving portions 41 are formed in the outer side surfaces (surfaces facing vertically outward with the connection assisting members 40 inserted in the guide recesses 23) of the pair of connection assisting members 40. The drive shaft receiving portions 41 are arranged on right end sides of the connection assisting members 40. The drive shaft receiving portions 41 are open in the back surfaces of the connection assisting members 40. Drive shafts 55 of the operating member 50 are accommodated into the drive shaft receiving portions 41. The connection assisting members 40 move in the lateral direction by the drive shaft receiving portions 41 being pushed by the drive shafts 55 according to the rotation of the operating member 50.

Figure 4:
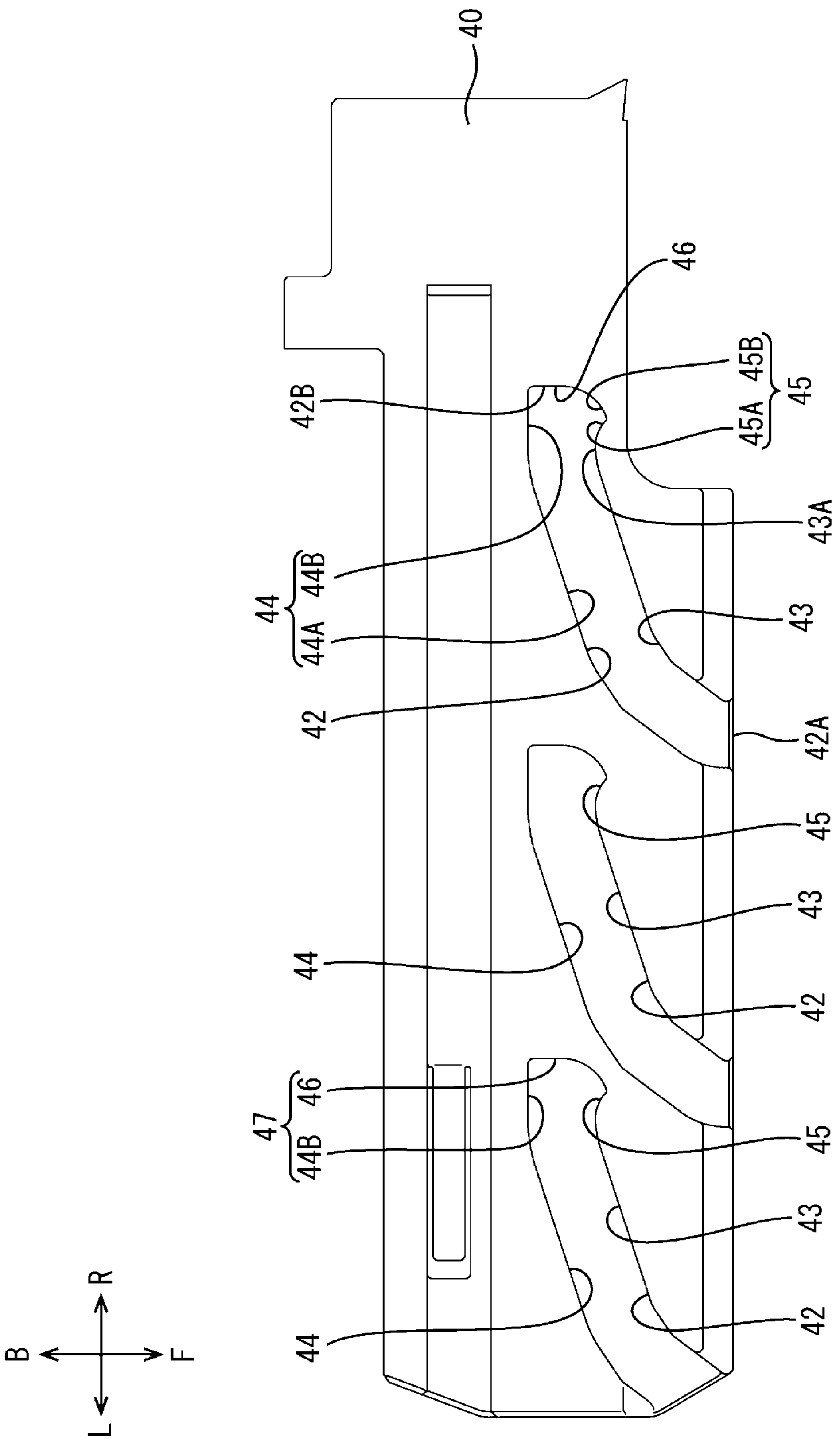
FIG. 4 is a view of the connection assisting member viewed from inside.

As shown in FIGS. 3 and 4, the cam grooves 42 are formed by recessing the inner side surfaces (surfaces facing vertically inward with the connection assisting members 40 inserted in the guide recesses 23) of the pair of connection assisting members 40. A plurality of the cam grooves 42 are provided side by side in the lateral direction. The cam groove 42 is formed to extend from an entrance 42A open in the front surface of the connection assisting member 40 to a back end 42B. The cam groove 42 has a connection cam surface 43 and a separation cam surface 44 facing each other in the front-back direction, a recess 45 and a back end surface 46. The connection cam surface 43 is provided on a front side of the cam groove 42, and the separation cam surface 44 is provided on a back side of the cam groove 42. The connection cam surface 43 is inclined rightward toward the back side from a right end part of the entrance 42A. The recess 45 is connected to an end part 43A of the connection cam surface 43 on the side of the back end 42B and recessed forward of the end part 43A of the connection cam surface 43 on the side of the back end 42B. Specifically, the recess 45 is recessed forward from a virtual line (see broken line indicating an "opening width 45W" of FIG. 8) in the lateral direction passing through the end part 43A. The recess 45 is recessed in the entire cam groove 42 in the vertical direction (depth direction). The recess 45 has a first inclined surface 45A connected to the end part 43A of the connection cam surface 43 on the side of the back end 42B without any step and inclined forward toward the back end 42B, and a second inclined surface 45B bent and connected to a right end part (end part on the side of the back end 42B) of the first inclined surface 45A and inclined backward toward the back end 42B. The first inclined surface 45A corresponds to an example of an “inclined surface”. A right end part (end part on the side of the back end 42B) of the second inclined surface 45B is connected to a front end part of the back end surface 46. The inner surface of the recess 45 is constituted by the first and second inclined surfaces 45A, 45B.

As shown in FIG. 4, the separation cam surface 44 includes an inclined cam surface 44A inclined rightward toward the back side from a left end part of the entrance 42A, and a flat cam surface 44B extending from a right end part of the inclined cam surface 44A (end part of the inclined cam surface 44A on the side of the back end 42B) toward the back end 42B. The flat cam surface 44B is arranged to face the recess 45 in the front-back direction. A right end part of the flat cam surface 44B (end part of the flat cam surface 44B on the side of the back end 42B) is connected at a right angle to a back end part of the back end surface 46. The cam groove 42 includes a corner portion 47 constituted by the flat cam surface 44B and the back end surface 46. The flat cam surface 44B is arranged along the lateral direction, and the back end surface 46 is arranged along the vertical direction.

Figure 5:
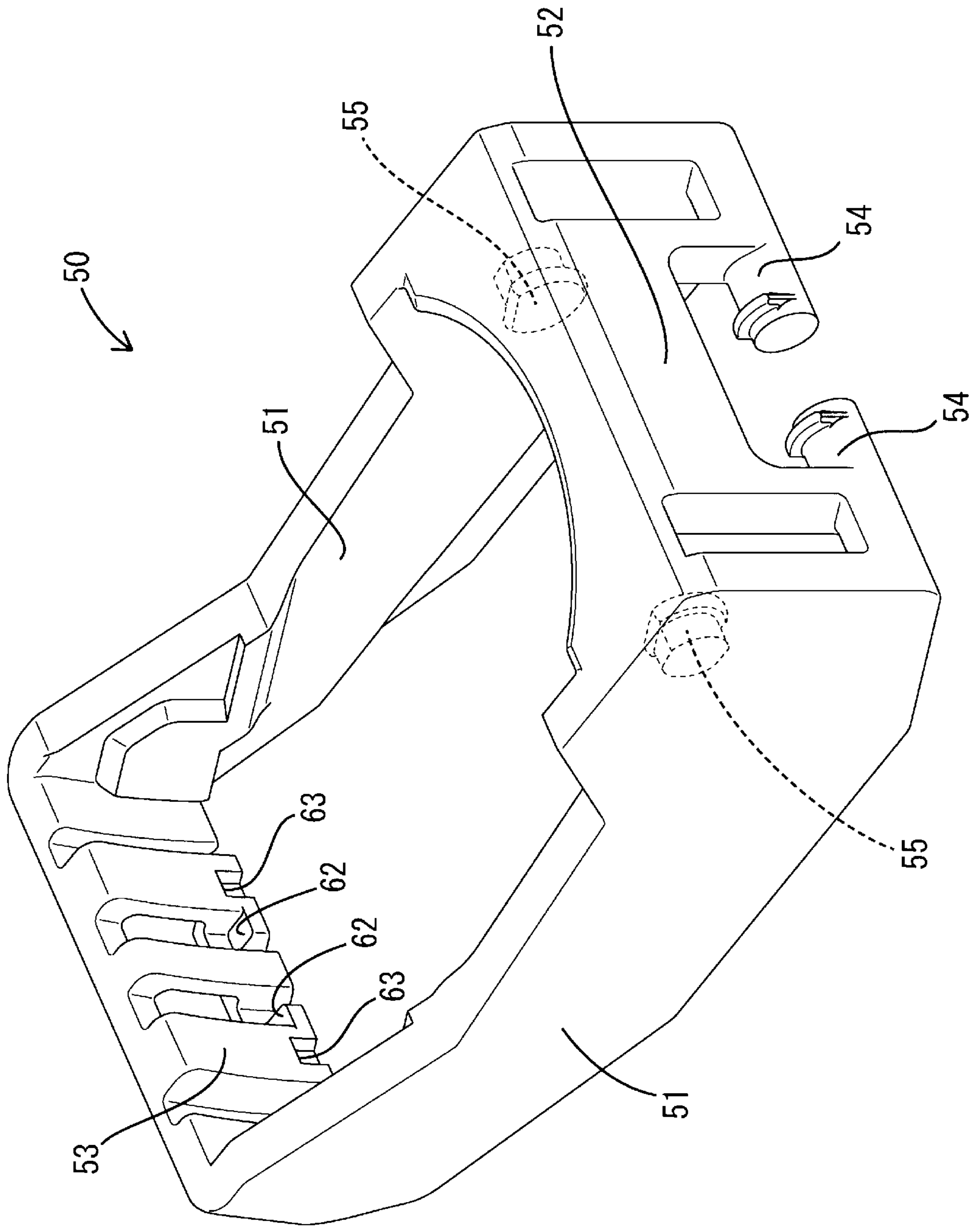
FIG. 5 is a perspective view of the operating member.

The operating member 50 is made of synthetic resin. The operating member 50 is a member to be gripped and operated by a worker when the first connector 11 is connected to the second connector 12, and is a lever in this embodiment. As shown in FIG. 5, the operating member 50 has a frame shape as a whole. Specifically, the operating member 50 includes a pair of upper and lower arm portions 51, a first coupling portion 52 coupling base end sides (sides of rotary shafts 54 to be described later) of the pair of arm portions 51 and a second coupling portion 53 coupling tip sides (sides to be gripped by the worker) of the pair of arm portions 51. Each of the arm portions 51 and the first and second coupling portions 52, 53 is in the form of a plate.

As shown in FIGS. 5 and 7, the operating member 50 includes a pair of upper and lower rotary shafts 54 and a pair of upper and lower drive shafts 55. The pair of rotary shafts 54 and the pair of drive shafts 55 are respectively arranged on a base end side of the operating member 50 with axes aligned with the vertical direction. The pair of rotary shafts 54 and the pair of drive shafts 55 are respectively formed to project vertically inward from the inner side surfaces of the pair of arm portions 51. The pair of drive shafts 55 are arranged closer to a tip side of the operating member 50 than the pair of rotary shafts 54.

As shown in FIG. 5, the operating member 50 includes a pair of upper and lower first lock receiving portions 62 and a pair of upper and lower second lock receiving portions 63. The pair of first lock receiving portions 62 and the pair of second lock receiving portions 63 are formed in the inner side surface of the second coupling portion 53. The first lock receiving portions 62 are locked to the first locking portions 35 of the first housing 20. In this way, a displacement of the operating member 50 arranged at the connection position toward the initial position is restricted. The second lock receiving portions 63 are locked to the second locking portions 36 of the first housing 20. In this way, a displacement of the operating member 50 arranged at the connection position toward a side opposite to the initial position is restricted.

The second connector 12 includes a second housing 90 made of synthetic resin. Unillustrated male terminal fittings are mounted into the second housing 90. As shown in FIGS. 6 and 7, the second housing 90 includes cam pins 91 projecting vertically outward. As shown in FIG. 8, the cam pin 91 includes an angle portion 92 angular when viewed from an axial direction (upward direction) of the cam pin 91. The cam pin 91 is arcuate except at the angle portion 92 when viewed from the axial direction of the cam pin 91. The angle portion 92 is provided on a back side of the cam pin 91 and projects obliquely to a right back side from a cylindrical body part. Specifically, the cam pin 91 has a first surface 93 extending in the lateral direction, a second surface 94 connected to a right end part of the first surface 93 and extending in the vertical direction and a third surface 95 arcuately extending from a front end part of the second surface 94 to a left end part of the first surface 93. The first and second surfaces 93, 94 define the right-angled angle portion 92. A lateral width of the cam pin 91 is larger than the opening width 45W in the lateral direction of the recess 45.

Next, functions and effects of the connector 10 are described.

The first connector 11 is assembled as follows. First, the pair of connection assisting members 40 are mounted into the housing body 21. Then, the operating member 50 is mounted from behind the housing body 21. Thereafter, the unillustrated terminal fittings are inserted into the housing body 21 and the wire cover 22 is assembled with the housing body 21. In the above way, the assembling of the first connector 11 is completed.

In connecting the first housing 20 to the second housing 90, the operating member 50 is arranged at the initial position as shown in FIG. 6. At the initial position, the tip sides of the arm portions 51 are arranged behind the wire cover 22. The rotary shafts 54 of the operating member 50 are fit into the rotary shaft receiving portions 24 of the housing body 21 and the drive shafts 55 of the operating member 50 are fit into the drive shaft receiving portions 41 of the connection assisting members 40. Further, the drive shafts 55 are arranged behind and to the right of the rotary shafts 54. Then, the second housing 90 is lightly fit into the first housing 20 from front, and the cam pins 91 of the second housing 90 are arranged at the entrances 42A of the cam grooves 42. If the operating member 50 is rotated toward the connection position about the rotary shafts 54 from this state, the connection assisting members 40 move leftward by being pushed by the operating member 50, and the cam pins 91 slide toward the back ends 42B along the connection cam surfaces 43. In this way, the connection cam surfaces 43 are pushed forward by the cam pins 91 and the connection of the first and second housings 20, 90 proceeds. In a final stage of the process of connecting the first and second housings 20, 90, the cam pins 91 move beyond the end parts 43A of the connection cam surfaces 43 on the side of the back ends 42B.

With the first and second housings 20, 90 connected to each other, the cam pin 91 is arranged not to contact the inner surface (specifically, first and second inclined surfaces 45A, 45B) of the recess 45 as shown in FIG. 8. Further, the cam pin 91 is so arranged that a front end part enters the recess 45. Further, the angle portion 92 of the cam pin 91 is arranged to face the corner portion 47 of the cam groove 42. Specifically, the first surface 93 of the angle portion 92 is facing the flat cam surface 44B in the front-back direction without contacting the flat cam surface 44B, and the second surface 94 of the angle portion 92 is facing the back end surface 46 of the cam groove 42 in the lateral direction in proximity to or in contact with the back end surface 46.

If the operating member 50 is rotated toward the initial position, the connection assisting members 40 move rightward and the cam pins 91 slide toward the entrances 42A along the separation cam surfaces 44. In this way, the cam pins 91 slide on the separation cam surfaces 44 and the first housing 20 is separated from the second housing 90.

As described above, this connector 10 includes the connection assisting members 40. The cam grooves 42 of the connection assisting members 40 have the connection cam surfaces 43 to be pushed forward of the first housing 20 by the cam pins 91. Thus, the first housing 20 can be connected to the second housing 90 by the connection assisting members 40. Further, the cam grooves 42 of the connection assisting members 40 have the recesses 45 connected to the end parts 43A of the connection cam surfaces 43 on the side of the back ends 42B and recessed forward of the end parts 43A of the connection cam surfaces 43 on the side of the back ends 42B. In the connected state, the cam pins 91 are arranged not to contact the inner surfaces of the recesses 45. Thus, even if vibration is transmitted to this connector 10, the cam pins 91 are unlikely to contact the cam grooves 42, with the result that stresses applied to the cam pins 91 in the connected state can be reduced.

Further, since the cam pin 91 includes the angle portion 92, strength is higher as compared to a configuration not including the angle portion 92. Further, since the angle portion 92 is provided on the back side of the cam pin 91, it can be avoided that the angle portion 92 contacts the inner surface of the recess 45 and a stress is applied to the cam pin 91.

Further, since the cam pin 91 is arranged not to contact not only the inner surface of the recess 45, but also the connection cam surface 43 in the connected state of this connector 10, a stress received from the cam groove 42 by the cam pin 91 can be further reduced.

Further, since the recess 45 is provided with the first inclined surface 45A in this connector 10, the cam pin 91 can be made less likely to contact the inner surface of the recess 45.

Other Embodiments of Present Disclosure

The embodiment disclosed this time should be considered illustrative in all aspects, rather than restrictive.

(1) Although the cam pin is arranged to enter the recess in the connected state in the above embodiment, the cam pin only has to be configured not to contact the inner surface of the recess and may be configured not to enter the recess.

(2) Although the connection assisting member is movable in the lateral direction with respect to the first housing via the operating member in the above embodiment, the connection assisting member may be a slide lever for connecting and separating the first and second connectors by a sliding movement without requiring the operating member or the connection assisting member itself may be a so-called rotary lever rotatably supported on the first housing like the operating member to connect and separate the first and second connectors by a rotational movement.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a first housing and a second housing to be connected to each other; and a connection assisting slider to be mounted into the first housing, wherein:

the second housing includes a cam pin, the connection assisting slider includes a cam groove extending from an entrance open in a front surface of the connection assisting slider to a back end, the front surface of the connection assisting slider facing a front direction, the cam groove has a connection cam surface to be pushed by the cam pin in the front direction toward the first housing and a recess connected to an end of the connection cam surface on a back end side of the cam groove, the recess being recessed in the front direction at a front portion of the back end side of the cam groove and extending more in the front direction than the end of the connection cam surface, and when the first and second housings are in a connected state, the cam pin is positioned at the back end of the cam groove and the cam pin is arranged not to contact an inner surface of the recess.

2. The connector of claim 1, wherein the cam pin includes an angle portion having an angular shape on a side opposite to the connecting direction when viewed from an axial direction of the cam pin.

3. The connector of claim 1, wherein the cam pin is arranged not to contact the connection cam surface in the connected state.

4. The connector of claim 1, wherein the recess has a first inclined surface connected to the end of the connection cam surface on the back end side of the cam groove without any step.

5. The connector of claim 1, wherein the recess includes a second inclined surface having one end connected to and bent from the first inclined surface and another end connected to the back end of the cam groove.

6. The connector of claim 1, wherein the first housing includes a guide recess configured to the receive the connection assisting slider, the connection assisting slider being movable within the guide recess in a lateral direction with displacements in a front and back direction being restricted.

* * * * *